United States Patent [19]
Bidgood

[11] 3,953,114
[45] Apr. 27, 1976

[54] CUSHION RETAINING MEANS FOR EYEGLASSES

[76] Inventor: William T. Bidgood, 1032 W. Peachtree St., Atlanta, Ga. 30309

[22] Filed: Sept. 23, 1974

[21] Appl. No.: 508,415

[52] U.S. Cl................................. 351/123; 351/122
[51] Int. Cl.². ............................................. G02C 5/16
[58] Field of Search........................... 351/122, 123

[56] References Cited
UNITED STATES PATENTS

| 538,151 | 4/1895 | Bussey .................................. 351/123 |
| 1,524,321 | 1/1925 | Stevens et al. ...................... 351/122 |
| 1,743,796 | 1/1930 | Nelson ............................ 351/123 X |
| 1,966,717 | 7/1934 | Green ................................. 351/123 |
| 2,031,771 | 2/1936 | Grier.................................. 351/123 |
| 2,229,568 | 1/1941 | Hodgkins............................ 351/123 |
| 2,561,402 | 7/1951 | Nelson................................ 351/123 |

FOREIGN PATENTS OR APPLICATIONS
1,535,556 7/1968 France................................ 351/122

*Primary Examiner*—Paul A. Sacher
*Attorney, Agent, or Firm*—Jones, Thomas & Askew

[57] ABSTRACT

Retaining means for eyeglasses, the retaining means comprising wedge-shaped cushion members engageable with the temple pieces of the eyeglasses, the cushion members including a thinner portion to engage the top of the ears to provide greater confort to the wearer, and a thicker portion to provide a wedging action against the back of the ear to prevent forward motion of the temple pieces.

3 Claims, 10 Drawing Figures

CUSHION RETAINING MEANS FOR EYEGLASSES

This invention relates to frames for eyeglasses, and is more particularly concerned with apparatus for retaining eyeglasses in place without discomfort to the wearer.

It is common and well recognized problem that eyeglasses are wont to slip forward on the wearer's face so that the lenses are moved down and out in a path determined by the wearer's nose. In addition to the annoyance and discomfort caused by such slippage, the wearer is deprived of the proper benefit of corrective lenses because the corrective lenses are designed so that the wearer should look through the optical axis of the lenses with the lenses a predetermined distance from the eyes. When the lenses are displaced from the predetermined position, the wearer will normally look through the lenses at a point above the optical axis and with the lenses at an excessive distance from the wearer's eyes.

In the past, a number of solutions have been proposed to the above stated problem. These solutions have included the rather obvious ones of clamping the temple pieces of the eyeglasses more firmly against the head of the wearer, providing more distinct hooks on the temple pieces to hook securely around the ears of the wearer, and providing an elastic band to pass around the wearer's head and fasten to both temple pieces of the eyeglasses. Among the less obvious solutions to the problem has been the provision of weights at the rearmost portion of the temple pieces to urge the ear hooks down in order to hold the lenses up; and, there has been some effort to solve the problem through the use of appendages carried by the ear hooks to engage the ears of the wearer in a more hook-like fashion without actually changing the ear hooks that are formed integrally with the temple pieces.

All of the above mentioned prior art efforts are somewhat successful in retaining eyeglasses in their proper location on a wearer's face, but the comfort of the wearer tends to be overlooked. Also, many of the prior art solutions are such that one must allow an optician to adjust the eyeglasses. Since the frames of eyeglasses becomes distorted with everyday wear, it becomes inconvenient and very time consuming to vist an optician frequency enough to keep a pair of eyeglasses properly adjusted.

The present invention overcomes the above-mentioned and other difficulties with the prior art by providing removably fixed cushion members on the ear hooks of the temple pieces of eyeglasses, the cushion members providing a wedging action for retaining the temple pieces in their proper position. Since the principal difficulty with eyeglasses is the partial straightening of the ear hooks so that the temple pieces can move forward with respect to the head of the wearer, a wedge member placed between the temple pieces and the ear of the wearer will generally solve the problems without the use of weights or the like. However, the cushion members of the present invention can be used with advantage in conjunction with weighted ear hooks for eyeglasses. The cushion members of the present invention may take the form of a conventional foamed or sponge-like material or a fluid filled member, and can be shaped and adjusted to fit the needs of the individual wearer. If weights or the like are used in conjunction with the cushion members of the present invention, the amount of weights can be noticeably reduced, and the cushioning member will increase the comfort of the wearer.

These and other features and advantages of the present invention will become apparent from a consideration of the following specification when taken in conjunction with the accompanying drawings in which.

Figure 1:
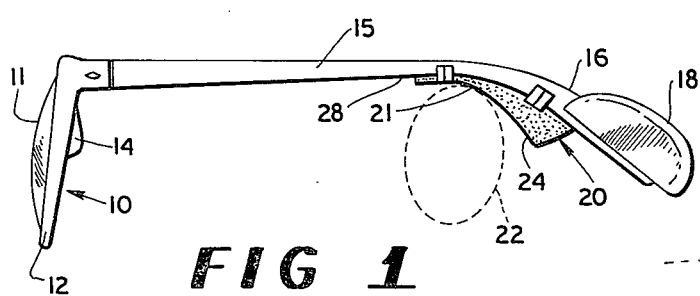
FIG. 1 is a side elevational view of a pair of conventional eyeglasses having a cushion member made in accordance with the present invention attached thereto in conjunction with a weighted temple piece.

Referring now more particularly to the drawings, and to those embodiments of the invention here chosen by way of illustration, FIG. 1 of the drawings shows a pair of substantially conventional eyeglasses 10 including lenses 11 with lens frames 12 surrounding the lenses 11, and nose pads 14 for engaging the nose of a wearer. Extending rearwardly from the lens frame 12 is a pair of temple pieces 15 terminating in a pair of ear hooks 16. Though it will be realized that there is a pair of lenses 11, temple pieces 15 and ear hooks 16, only one of each is here shown in FIG. 1 for convenience of illustration.

The ear hook 16 carries a weight 18 which may be of any desired form since a weight per se is not a part of the present invention. Further, though the weight 18 is here shown as a removably attachable weight, the weight 18 may also be formed integrally with the ear hook as is well known in the art. Regardless of the particular form of the weight 18, it is contemplated that the weight 18 will be located approximately at the extending free end of the temple piece 15, and a cushion member 20 made in accordance with the present invention will be located somewhat inwardly of the weight 18.

The cushion member 20 generally includes a wedge shaped member having the thinner portion 21 locatable to engage the upper portion of the wearer's ear which is indicated in phantom at 22, and the thicker portion 24 locatable rearwardly of the ear 22. The arrangement is such that the thicker portion 24 will engage the rearward portion of the ear 22 to prevent the temple piece 15 from moving forward with respect to the wearer's ear. This will prevent the nose pads 14 from riding down along the wearer's nose.

In the embodiment shown in FIG. 1 of the drawings, the weight 18 urges the ear hooks 16 down so that the cushion, member 20 will always remain in engagement with the ear 22 of the wearer; however, considerable advantage can be had through use of the cushion member 20 alone.

Figure 3:
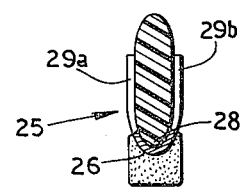
FIG. 3 is a cross sectional view taken substantially along the line 3—3 of FIG. 2.
Figure 2:
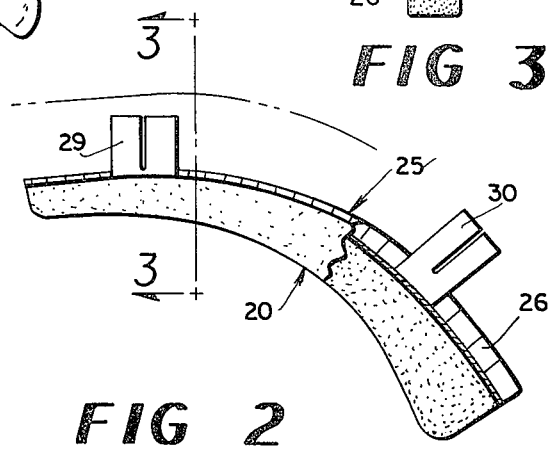
FIG. 2 is a side elevational view of one preferred form of cushion member made in accordance with the present invention, partially in cross section to show the construction thereof.
Figure 4:
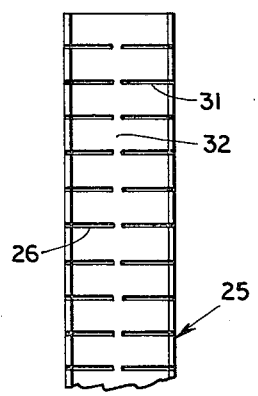
FIG. 4 is a top plan view, partially broken away, of one form of attaching means for the device of the present invention.

Referring now to FIGS. 2–4 of the drawings, it will be seen that the cushion member 20 is formed of a conventional cushion material such as any foamed material, sponge or the like appropriately shaped as previously described. The cushion member 20 is fixed to an attaching member generally designated at 25 by glue or other convenient means. The attaching member 25 includes a channel member 26 having a cross-sectional shape to receive the lower edge 28 of the temple piece 15, and includes upstanding clamp members 29 and 30. As more clearly seen in FIG. 3, the clamp members 29 comprise a pair of opposed arms 29a and 29b which are formed integrally with the channel 26 and are shaped to conform to the sides of the temple piece 15. By this arrangement, the attaching means 25 can be snapped onto the appropriate portion of the temple piece 15 in order to locate the cushion member 20 at the desired location.

Looking at FIG. 4 of the drawings, it will be seen that the channel 26 has a plurality of slits 31 spaced along the length thereof, the slits 31 being discontinuous so that there remains a center area 32 that will hold the segments of the channel 26 together. Through the use of plurality of slits 31, it will be seen that the channel member 26 will be easily bendable so that the channel member 26 can be made to conform to virtually any configuration of ear hooks 16.

Figure 5:
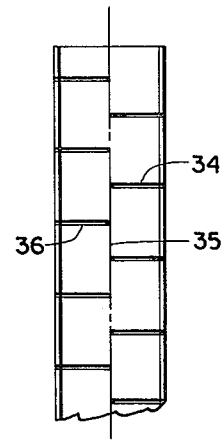
FIG. 5 is a view similar to FIG. 4 but showing a slightly modified form of attaching member.

FIG. 5 of the drawings shows a modification of the attachings means 25, the difference being in the arrangement of the slits that provide flexibility of the channel 26. In the embodiment shown in FIG. 5 of the drawings, there is a first plurality of slits 34 that extends from one side of the channel 26 substantially to the centerline 35 of the channel member 26; and, there is a second series of slits 36 that extend from the opposite side of the channel 26 substantially to the centerline 35 of the channel 26. With this arrangement it will be seen that the channel 26 will be more flexible since, in order to bend the channel 26, it is necessary only to warp the segments of material between the slits 34 and the slits 36. As a result of this arrangement, the channel member shown in FIG. 5 will have a somewhat irregular appearance from the outside after the channel member is bent; however, the channel member will be more easily bendable and will therefore be desirable in some situations.

In using the attaching means, it should now be understood that the attaching means 25 will be bent to conform to the appropriate area of the temple piece 15, which will normally be in the area designated as the ear hook 16. Since the lower edge 28 of the temple piece 15 will usually be concave, the attaching means 25 will be bent to be convex. The clamp members 29 and 30 will therefore be located to be substantially within the convex area of the channel member 26 when the channel 26 is bent. With the convex portion of the channel 26 held securely against the temple piece 15, the opposite ends of the channel 26 will be held against the temple piece 15 by the natural elasticity of the material.

Figure 6:
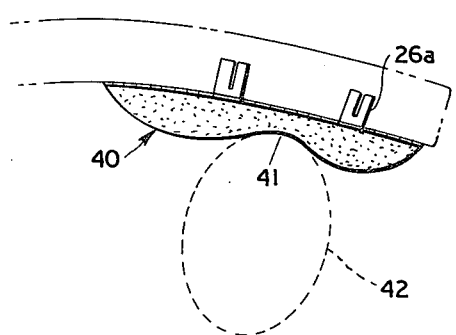
FIGS. 6–8 are views similar to FIG. 2 but showing modified forms of cushion members.

Referring now to FIG. 6 of the drawings, a slightly modified cushion member is illustrated, this cushion member being designated generally at 40. The cushion member 40 includes an attaching means 26a as previously described, and the only difference in the cusion member 40 and the cushion member 20 is in the configuration of the cushion itself. The cushion member 40 shown in FIG. 6 of the drawings includes a central identical portion 41 to engage the ear 42, and a wedging action is provided on each side of the ear 42. Such an arrangement could be advantageous in order to distribute the weight of the glasses over a larger portion of the ear 42, and this could especially be used to advantage in conjunction with weighted temple pieces as disclosed in FIG. 1 of the drawings.

Figure 7:
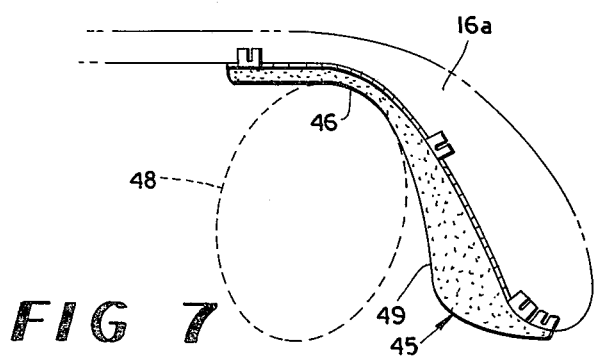

In FIG. 7 of the drawings, a further embodiment 45 of the cushion member is illustrated, the cushion member 45 being used in conjunction with a very distinct ear hook 16a. The cushion member 45 includes a relatively narrow, or thinner, portion 46 of the cushion extending upwardly and over the ear 48, and includes the thicker portion 49 of the cushion extending down completely to the end of the ear hook 16a. Through this arrangement, it will be seen that th cushion member 45 is itself formed substantially as a hook member.

Figure 8:
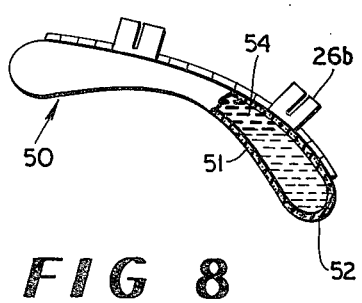

FIG. 8 of the drawings shows a different construction for the cushion member; and, while the configuration of the cushion is substantially like that shown in FIG. 6 of the drawings, it will be understood that the configuration can vary and that the drawing is intended to show the construction rather than a precise configuration.

It will be seen that the cushion member 50 illustrated in FIG. 8 of the drawings includes an attaching member 26b which is constructed substantially as illustrated in FIG. 2; however, the cushion 51 is formed of a flexible material such as rubber or the like and includes an impervious wall member 52 with a fluid 54 therein. The fluid 54 can be liquid or gas, and the cushion 51 could conveniently take the form of an air bag having a very low pressure therein. Such an arrangement would have the distinct advantage of distributing the pressure completely equally along the surface of the cushion member 51 that is engaged by the ear of the wearer.

Figure 10:
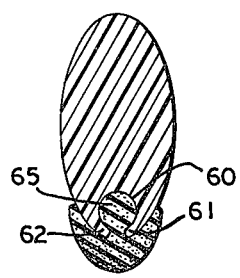
FIG. 10 is an enlarged cross sectional view taken substantially along the line 10—10 in FIG. 9.
Figure 9:
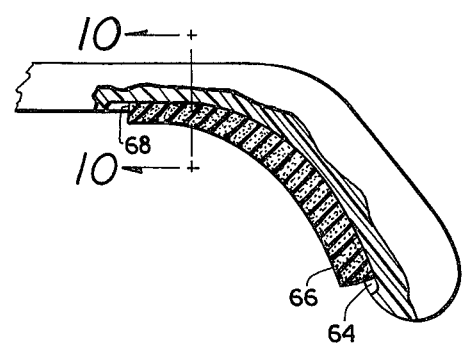
FIG. 9 is a side elevational view of a modified form of attaching means for the cushion member of the present invention.

Looking now at FIGS. 9 and 10 of the drawings, it will be seen that the present invention is adaptable not only as an attachment to existing eyeglasses as has been discussed in conjunction with FIGS. 1–8 of the drawings, but is also adaptable to eyeglasses manufactured specifically for the cushion members in accordance with the present invention. In FIGS. 9 and 10 it will be seen that the ear hooks and at least a portion of the temple piece is provided with a groove 60, the groove 60 terminating in slightly closed slips 61. The groove 60 preferably extends along a length of the temple piece greater than the probable length of a cushion member 62, and the groove 60 opens inwardly at 64.

The cushion 62 is formed with a rib 65 that is shaped complementarily to the groove 60 so that the rib can be fed into the opening 64 and passed through the groove 60. Of course the cushion 62 will have a thicker portion 66 and a thinner portion 68 in accordance with the previously stated concept of the present invention.

From the foregoing it will be seen that, for any existing eyeglasses, the proper positioning can be improved through the use of an appropriate cushion member made in accordance with the present invention. When the eyeglasses have just been adjusted by an optician or the like, the cushion member may be moved rearwardly along the ear hook; however, as the glasses are worn, with normal use the ear hooks will become loosened so that the glasses no longer stay in place, and so that the ear hooks no longer properly engage the ears of the wearer. At such time the cushion member of the present invention will be moved forward so that the larger portion of the wedge engages the rear portion of the ear of the wearer.

If the eyeglasses have an ear hook such as that pictured in FIG. 1 of the drawings, a cushion member such as the cushion member 20 might be used. The cushion member 20 provides the rearwardly disposed larger portion that can be adjusted to provide a wedging action to prevent forward movement of the eyeglasses; and, as the ear hooks 16 becomes more and more straightened the cushion member 20 can be moved more and more forward to adapt the temple pieces 15 to the wearer for proper fit.

Some eyeglasses have temple pieces that are almost straight, and are designed to be retained in place by clamping against the head of the wearer. Such temple pieces can be rendered more comfortable through the use of a cushion member such as that illustrated in FIG. 6, or FIG. 8, of the drawings. The clamping of such eyeglasses is uncomfortable if too tight, and it fails to hold the glasses in place if too loose. The cushion member 40 provides a wedging action in both a forward and a rearward direction to assure glasses the glass stay in the proper location. A small weight such as that shown in FIG. 1 will assist in maintaining the proper position, though a weight would not be necessary.

Especially if weight are to be used in conjunction with the cushion members, the cushion as illustrated in FIG. 8 may be desirable. Because of the fluid within the cushion member 50, the cushion member will distribute the weight evenly over the entire area engaged by the cushion member.

The construction of the attaching member is such that the channel 26 can be shaped to fit any variety of eyeglasses, and can be adjusted to place the cushion member at any desired location along the temple piece of the eyeglasses. Due to the very simple clamping means, there is not restriction as to the location of the cushion member, and the channel 26 is sufficiently bendable to adapt to any curvature. For extreme curvatures, the arrangement shown in FIG. 5 may be preferred, but the arrangement shown in FIG. 4 will serve quite well on most eyeglasses, and the device as shown in FIG. 4 will have a more nearly smooth appearance.

The cushion member and attaching means illustrated in FIGS. 9 and 10 is primarily for eyeglasses that are manufactured to receive such a cushion member. While the channel 60 could be cut into existing temple pieces, it would be difficult and expensive. Once the channel 60 is provided, however, the rib 65 can be inserted into the channel, and slid therealong to position the cushion member as desired. While the rib 65 has been here disclosed as formed integrally with the cushion member, it will be obvious to those skilled in the art that the two pieces may be made separately, and the rib can take the form of a flexible cable, a chain, or other bendable material.

It will of course be understood that the embodiments of the invention here shown are by way of illustration only, and are meant to be in no way restrictive; therefore, numerous changes and modifications may be made, and the full use of equivalents resorted to, without departing from the spirit or scope of the invention as defined by the appended claims.

I claim:

1. Retaining means for eyeglasses comprising a cushion member for attaching to the temple pieces of eyeglasses, said cushion member including a generally wedge-shaped cushion member having a thinner portion and a thicker portion, and attaching means fixed to said cushion member for removably fixing said cushion member to the lower edge of said temple piece, said attaching means being bendable to conform to the shape of said lower edge of said temple piece, said attaching means being so constructed and arranged to locate said cushion member so that said thinner portion is engageable with the top of the ear of a wearer and said thicker portion is immediately rearward of the ear, and a weight carried by the extending end of said temple piece rearward of said cushion member, said weight being just sufficient for holding said thicker portion down behind the ear to prevent forward movement of said temple piece, the arrangement being such that said cushion member is selectively movable along said lower edge to retain said thicker portion immediately rearward of the ear said attaching means comprising a channel, said channel including a plurality of segments adjacent to one another and separated by a plurality of slits, at least one pair of clamp members carried by said channel and formed integrally with said segments and engageable with said temple piece, said channel being bendable selectively to provide a concave portion and a convex of said attaching means, said clamp members being located at said convex portion.

2. Retaining means as claimed in claim 1, said cushion member being formed of a sponge-like material.

3. Retaining means as claimed in claim 1, said cushion member comprising a flexible envelope, and a fluid partially filling said flexible envelope.

* * * * *